(12) United States Patent
Francks

(10) Patent No.: US 12,337,930 B2
(45) Date of Patent: Jun. 24, 2025

(54) ARM POWERED CYCLE

(71) Applicant: Richard Francks, Ephraim, UT (US)

(72) Inventor: Richard Francks, Ephraim, UT (US)

( * ) Notice: Subject to any disclaimer, the term of this patent is extended or adjusted under 35 U.S.C. 154(b) by 735 days.

(21) Appl. No.: 17/689,653

(22) Filed: Mar. 8, 2022

(65) Prior Publication Data

US 2023/0286609 A1 Sep. 14, 2023

(51) Int. Cl.
- B62M 1/16 (2006.01)
- B62K 3/00 (2006.01)
- B62K 21/18 (2006.01)
- B62M 1/12 (2006.01)

(52) U.S. Cl.
CPC ............... B62M 1/16 (2013.01); B62K 3/005 (2013.01); *B62K 21/18* (2013.01); *B62M 1/12* (2013.01)

(58) Field of Classification Search
CPC ........... B62M 1/16; B62M 1/12; B62K 3/005; B62K 21/18
See application file for complete search history.

(56) References Cited

U.S. PATENT DOCUMENTS

| | | | | |
|---|---|---|---|---|
| 5,544,906 A | * | 8/1996 | Clapper | B62K 5/05 280/281.1 |
| 2002/0113402 A1 | * | 8/2002 | Ochs | B62K 3/005 280/282 |
| 2011/0148068 A1 | * | 6/2011 | Hunt | B62K 13/02 280/234 |
| 2015/0210346 A1 | * | 7/2015 | Lofgren | B62K 5/023 280/249 |
| 2021/0403122 A1 | * | 12/2021 | Seljestad | B62K 5/08 |

* cited by examiner

*Primary Examiner* — Kevin Hurley
*Assistant Examiner* — Marlon A Arce
(74) *Attorney, Agent, or Firm* — Thorpe North & Western, LLP

(57) ABSTRACT

An arm powered cycle has an arm drive with a hand bar. Oscillating fore and aft movement of the hand bar is converted to rotational movement to drive a driven wheel by a dual, reverse motion slip clutch. The hand bar can have a U-shaped yoke with a seat positioned between uprights of the yoke. The yoke can be combined with an integrated steering mechanism to both drive the driven wheel and turn a directional wheel. A combiner can combine motion from the arm drive and a leg drive.

23 Claims, 13 Drawing Sheets

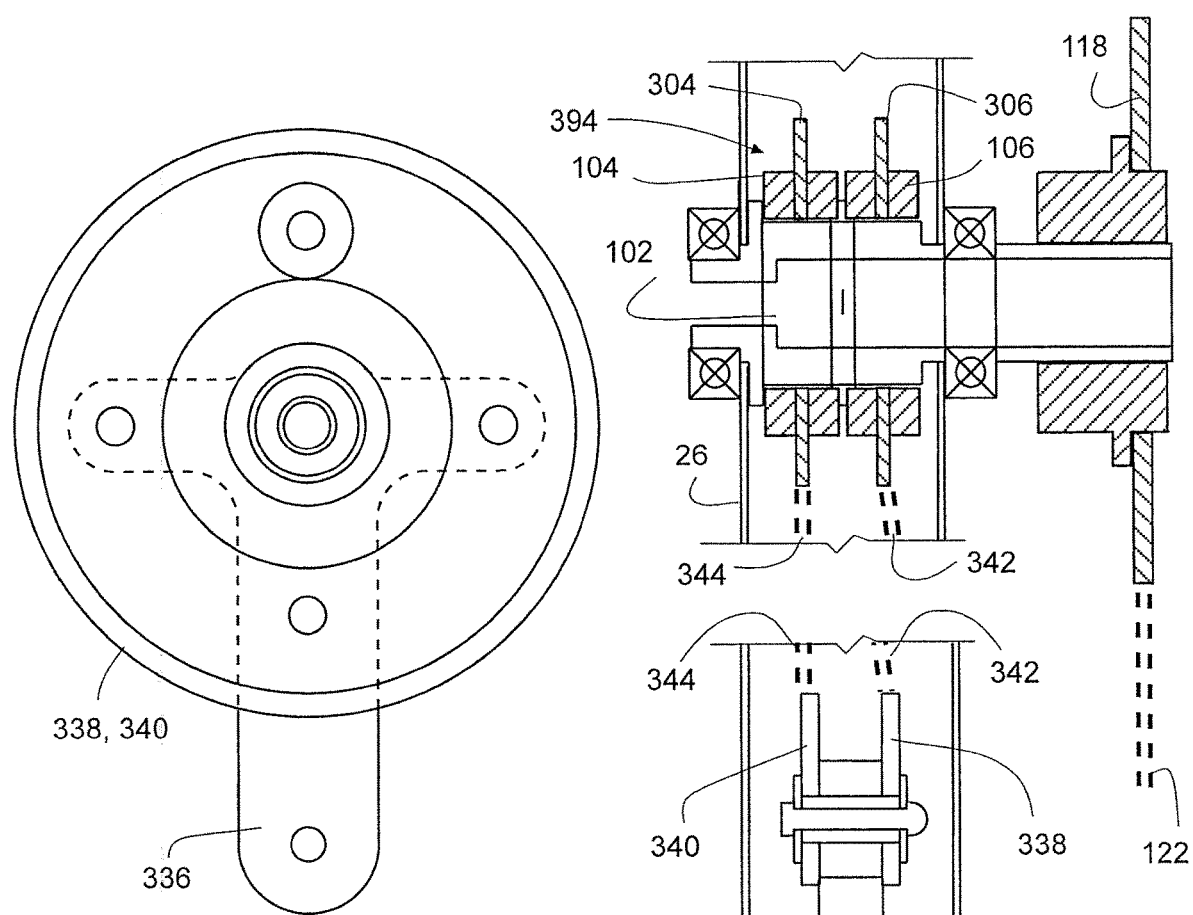
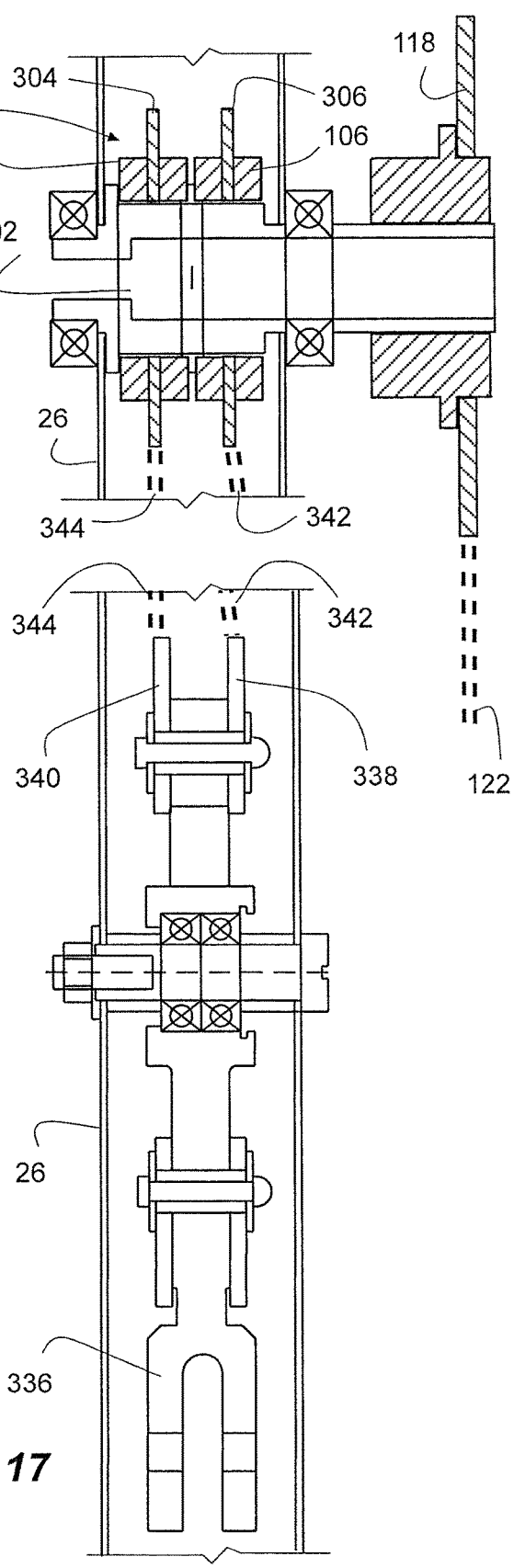
*Fig. 16*
*Fig. 17*

ARM POWERED CYCLE

BACKGROUND

Human-powered vehicles, such as the bicycle, are typically only leg and foot powered. Such bicycles are often configured with the rider sitting upon the frame and above the wheels. Recumbent bicycles have been developed in which the rider sits lower and often between the wheels. Tricycles have also been developed which utilize three wheels in either the upright or recumbent style. Such cycles can do little to utilize or exercise the rider's arms. Arm cranks have been proposed which position a foot-like crank in reach of the user's arms and hands. "Peddling" with arms and hands can be difficult. The development of cycles is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 16 is a side view of a bell crank with sprockets of the cycle of FIG. 13.

FIG. 17 is a partial cross-sectional schematic end view of the bell crank and the dual, reverse motion slip clutch of the cycle of FIG. 13.

Figure 1:
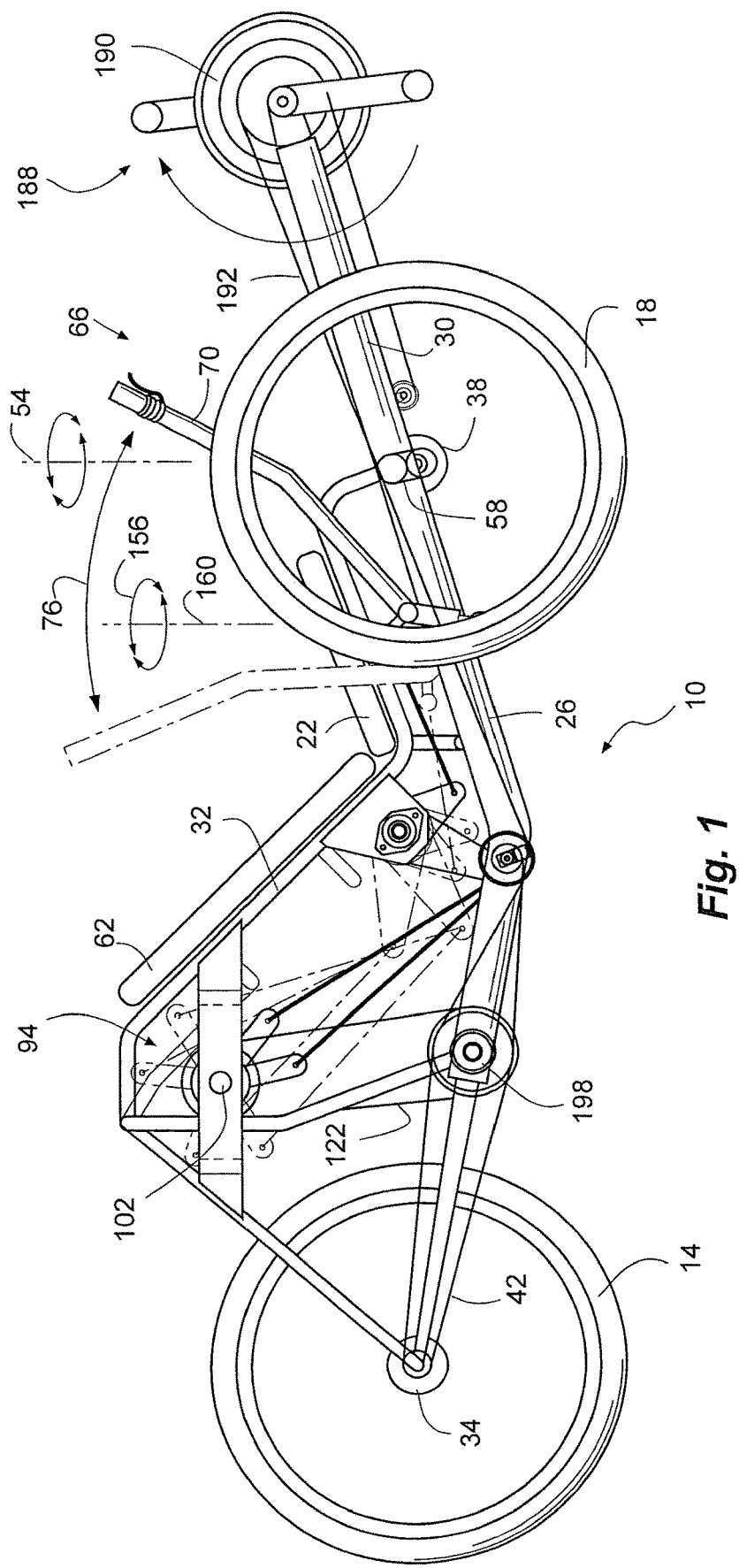
FIG. 1 is a side schematic view of a cycle with an arm powered drive with a hand yoke having a fore and aft motion and a dual, reverse motion slip clutch with a link system in accordance with an embodiment of the invention.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The invention provides a human-powered and rider-propelled vehicle that utilizes arm movement for propulsion. The vehicle can be a hand and/or arm powered cycle. For example, the cycle can be powered or driven by a rider's arms and engaged by the rider's hands. The vehicle can be configured as a recumbent tricycle with a pair of front wheels that steer, a rear driven wheel, and a seat positioned between the front and rear wheels. In the embodiments described herein, the vehicle described is a recumbent tricycle. The vehicle can also be a bicycle or a quadcycle, and can be configured as upright as well as recumbent.

The cycle can have a hand bar or lever, such as a yoke, that is grasped by a seated rider to power and drive the cycle. The hand bar pivots back-and-forth in a fore and aft direction to drive the rear driven wheel. The yoke is coupled to a multi-directional drive or converter by a linkage. The multi-directional drive or converter converts reciprocal linear back-and-forth motion of the hand bar to rotational motion of the driven wheel. Both push and pull force by the rider on the hand bar is utilized to drive the driven wheel. Both fore and aft movement of the hand bar drives the driven wheel without dead spots like a wheel-and-rod type crank, i.e. where linear motion of rod coupled to the wheel aligns with the rotational axis of the wheel.

The multi-directional drive or converter has a dual, reverse motion slip clutch with a pair of one-way slip clutches carried by an axle to drive the axle in one direction and slip with respect to the axle in the opposite direction. The hand bar turns the pair of slip clutches in opposite directions while driving the axle in a single forward direction. The hand bar drives the axle in a forward direction with an aft slip clutch when the hand bar is pulled in an aft direction while the fore slip clutch slips on the axle in an opposite rearward direction. Then the yoke again drives the axle in the forward direction with the fore slip clutch when the hand bar is pushed in a fore direction while the aft slip clutch slips on the axle in the opposite rearward direction.

The hand bar can be a U-shaped yoke with a pair of upright arms extending from a base. The base can be pivotally coupled under the seat at a fulcrum, with the seat positioned over the pivot and between the arms. The upright arms on the lateral sides of the seat position grips for an ergonomic grip.

The yoke can also have an integrated turn mechanism that can be utilized to steer the cycle. The yoke can be pivotally coupled to a gimbal which can be pivotally coupled to the frame. The yoke and the gimbal can pivot about a vertical axis. In addition, the yoke can be coupled to steer directional wheels so that the yoke can also steer the cycle.

The cycle can also have a foot crank coupled to the driven wheel. A combiner can combine the force and movement from both the yoke and the foot crank.

First Exemplary Embodiment

Referring to FIGS. 1-12, a hand cycle 10 is shown that can provide arm propulsion in addition to, or in place of, leg propulsion. The cycle 10 can be configured as a recumbent tricycle. Thus, the cycle 10 can have three wheels, including a rear driven wheel 14 and a pair of front directional wheels 18. A seat 22 can be positioned between the rear and front wheels 14 and 18. A frame 26 can carry the seat 22 and can be coupled to the wheels 14 and 18. The frame 26 can have an elongated spine 30 extending along a longitudinal axis of the cycle 10. The rear wheel 14 can be a driven wheel, and can be positioned closer to a rear of the frame 26 and the spine 30, and behind the seat 22. The front wheels 18 can be directional wheels, and can be positioned closer to a front of the frame 26 and the spine 30. The seat 22 can be spaced-above the spine and carried by an upper frame 32 carried by the spine 30. The frame 26 can be coupled to and between the hubs 34 and 38 of the rear and front wheels 14 and 18. The rear hub 34 can have a sprocket to receive a drive chain 42.

Figure 9:
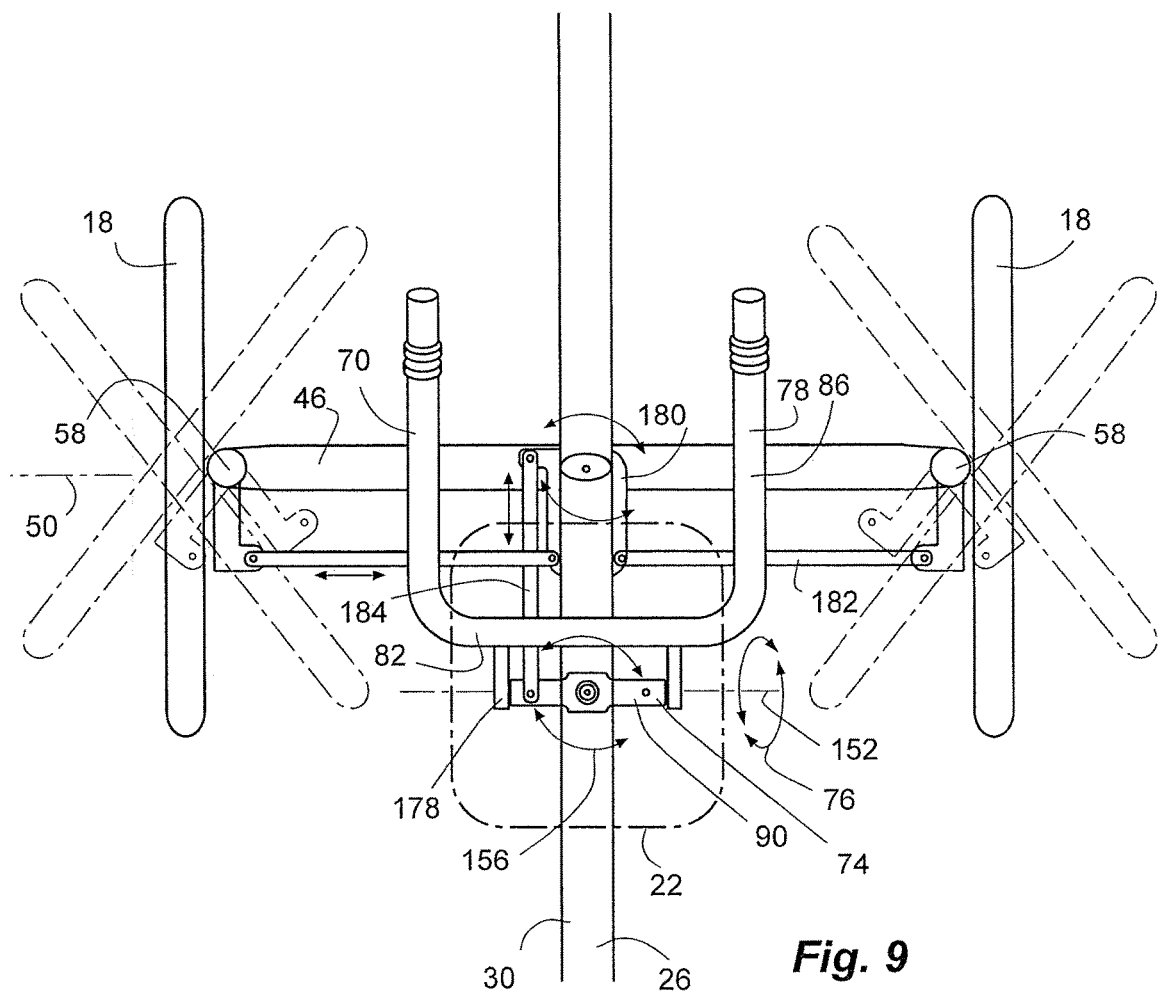
FIG. 9 is a partial top schematic view of the cycle of FIG. 1 showing the hand yoke and an integrated turning mechanism in accordance with an embodiment of the invention.
Figure 10:
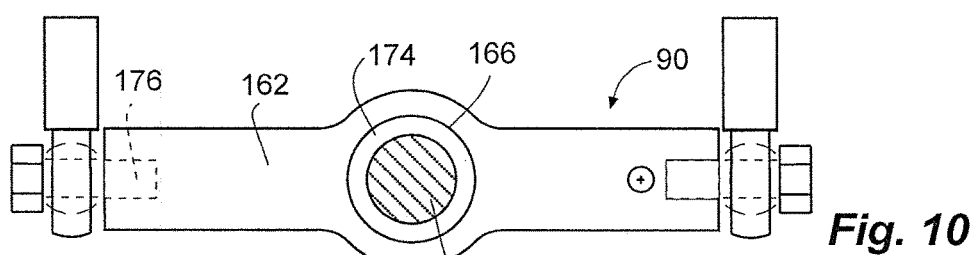
FIG. 10 is a top view of a gimbal of the hand yoke of the cycle of FIG. 1.
Figure 11:
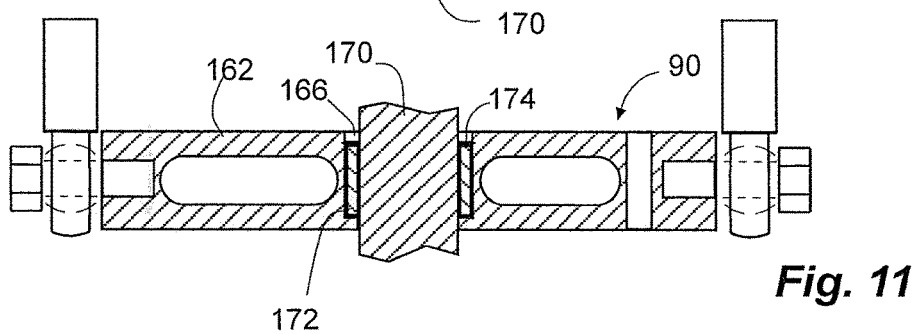
FIG. 11 is a cross-sectional side view of the gimbal of the hand yoke of the cycle of FIG. 1.

Referring to FIG. 9, the pair of front directional wheels 18 is pivotally coupled with respect to the elongated spine 30. The front wheels 18 can be coupled to the spine 30 by a spar 46 fixed to and extending transvers to the spine 30. The front wheels 18 can rotate in a vertical plane about a horizontal axis 50.

The front wheels 18 can be directional or steering wheels pivoting in a horizontal plane about a vertical axis 54 (FIG. 1). A spindle 58 can be coupled between each directional wheel 18 and the spar 54 of the frame 26. The directional wheels 18 can pivot with respect to the frame 26 about the spindles 58.

Referring to FIG. 1, the seat 22 can be oriented at incline with a top surface of the seat 22 facing away from the front wheels 18 so that the rider is pulled into the seat 22 during arm propulsion. The seat 22 can have a backrest 62 oriented at an incline with a forward surface facing the front wheels 18 so that the rider is pushed into the backrest 62 during arm propulsion.

Arm Drive

Referring again to FIGS. 2-7, the cycle 10 has an arm drive 66 that is capable of propelling, or assisting in the propulsion of, the cycle 10. The arm drive 66 is engaged by the rider's hands and is driven by the rider's hands, arms, and/or torso, such as the chest and pectoral muscles. The arm drive 66 is carried by the frame 26 and coupled to the driven wheel 14.

The arm drive 66 has a hand bar 70 pivotally coupled to the frame 26 and the spine 30 at a pivot 74. In one aspect, the pivot 74 can be located nearer the bottom of the spine 30, or under the bottom of the spine 30, which can keep the seat 22, the rider, and the center of gravity lower. The hand bar 70 is pivotal in a fore and aft direction 76 with respect to the seat 22. The hand bar 70 can form a lever with a fulcrum at the pivot 70. The hand bar 70 forms part of the arm drive 66.

Referring again to FIG. 9, in one aspect, the hand bar 70 can be or can include a yoke 78. The yoke 78 has a base 82 and a pair of upright arms 86. The base 82 of the yoke 78 can be pivotally coupled to the spine 30 by a gimbal 90. The gimbal 90 at the base 82 of the yoke 78 can define the pivot 74 and the fulcrum of the lever. The seat 22 and the yoke 78 can be positioned with the seat 22 in a cavity of the yoke between the pair of upright arms 86, and above the base 82. The yoke 78 pivots fore and aft with the seat 22 between the arms 86. Thus, the yoke 78 can provide an ergonomic configuration that allows the rider to push and pull the yoke 78 while seated on the seat 22. When the yoke 78 is pulled, the rider's body bears into the seat 22. When the yoke 78 is pushed, the rider's body bears into the backrest 62.

The hand bar 70 and the yoke 78 can have a grip to be grasped by the rider. For example, the distal free upper ends of the pair of upright arms 86 of the yoke 78 can have hand grips. The hand bar 70 and the yoke can also carry controls for the cycle 10, such as brake levers and gear shifts. The brake lever can be coupled adjacent the hand grips. The wheels 14 and 18 can have brakes, such as a brake disc coupled to the hubs 34 and 38. The brake lever can be coupled by a cable to calipers associated with the brake disc. Various sized sprockets can be coupled to the wheels 14 and 18 and the chains. A derailleur can be carried by the frame 26 adjacent the sprockets to move the chain between the various sized sprockets. A rotatable gear shift can be coupled adjacent the hand grips and coupled to the derailleur by a cable.

Converter—Rotational Motion—First Embodiment

Referring again to FIGS. 1-8, the arm drive 66 also comprises a multi-directional drive or a converter 94 to convert the linear oscillating motion 76 of the hand bar 70 and the yoke 78 to rotational motion 98 to drive the driven wheel 14. The arm drive 66 and the converter 94 include an axle 102 carried by the frame 26. In one aspect, the axle 102 can be mounted to the upper frame 32 and positioned behind the seat 22 and backrest 62, and between the seat 22 and the driven rear wheel 14. The axle 102 is associated with, and coupled to, the driven wheel 14. In one aspect, the axle 102 rotates 98 with respect to the frame 26.

A pair of co-axial, one-way slip clutches 104 and 106 is carried by and coupled to the axle 102. The slip clutches 104 and 106 can be collinear and positioned in a side-by-side relationship on the axle 102. The slip clutches 104 and 106 drive the axle 102 in one direction 98 and slip with respect to the axle 102 in the opposite direction. The slip clutches 104 and 106 can be driven back and forth in an oscillating pivotal motion about the axle 102. The slip clutches include a fore slip clutch 104 and an aft slip clutch 106. In one aspect, the slip clutches 104 and 106 can have one-way bearings. In another aspect, the slip clutches 104 and 106 can have crank arms 110 and 114 to drive the oscillating pivotal motion of the slip clutches 104 and 106. In another aspect, the slip clutches can have sprockets, and can be slip clutch sprockets, as described below. An output sprocket 118 can be affixed to the axle 102, and can be co-axial with the slip clutches 104 and 106 and the axle 102. As the axle 102 is turned by the slip clutches 104 and 106, the output sprocket 118 is turned 98. The axle 102 and the output sprocket 118 are coupled to the driven wheel 14 and the hub 34. In one aspect, a continuous hand chain 122 is formed in a loop about the output sprocket 118 of the axle 102, and coupled to a sprocket of the hub 34 of the driven wheel 14 via the drive chain 42, as described in greater detail below.

In one aspect, the pair of crank arms 110 and 114 can be coupled to and pivot along with the pair of slip clutches 104 and 106. A fore crank arm 110 can be coupled to the fore slip clutch 104 and an aft crank arm 114 can be coupled to the aft slip clutch 106. Each crank arm is fixed to a respective slip clutch and turns the slip clutch. In one aspect, the crank arms 110 and 114 extend in transverse directions with respect to one another and are located on opposite sides of the axle 102, or on opposite sides of a plane 124 defined by the axle.

In one aspect, the fore and aft slip clutches 104 and 106 simultaneously move in opposite rotational directions with respect to one another. In another aspect, the fore slip clutch 104 is pulled when driven, while the aft slip clutch 106 is pushed when driven.

Linkage—First Embodiment

The cycle 10 and the arm drive 66 can also include a linkage 126 coupled to the hand bar 70 and the yoke 78, and to the converter 94 and the pair of slip clutches 104 and 106. The linkage 126 can comprise a link bar 130 coupled to the yoke 78 above the fulcrum 74 and extending rearward under the seat 22. The link bar 130 can be rigid. The linkage 126 can also comprise an oscillating bell crank 134 carried by and pivotally coupled to the frame 26 and the spine 30 behind the seat 22 and the backrest 62. The bell crank 134 can have a pair of lobes 136 and 138 extending radially with respect to a pivot axis. The link bar 130 can be coupled to one of the lobes 136 of the bell crank 134, while the other lobe 138 of the bell crank 134 can be coupled to the slip clutches 104 and 106 and the crank arms 110 and 114.

The linkage 126 can also comprise a pair of rods 142 and 144 coupled to the other lobe 138 of the bell crank 134 and the pair of crank arms 110 and 114, respectively, in a wish-bone configuration. Thus, the pair of crank arms 110 and 114 are coupled to the linkage 126 to turn the pair of slip clutches 104 and 106. The fore and aft motion 76 of the hand bar 70 and the yoke 78 is translated to back-and-forth oscillation 148 and pivoting of the oscillating bell crank 134 by the link bar 130. The oscillating motion 148 of the bell crank 134 is translated to back-and-forth oscillation and pivoting of the slip clutches 104 and 106 by the pair of rods 142 and 144 and the crank arms 110 and 114. The oscillating motion of the slip clutches 104 and 106 is converted to rotational motion 98 of the axle 102 and the output sprocket 118.

In one aspect, the pair of rods 142 and 144 can be coupled to the other lobe 138 of the bell crank 134 and the pair of crank arms 110 and 114 by ball joints. For example, the ball joints can be spherical bearings, such as a rod end bearing or a Heim joint. In one aspect, a ball swivel of the Heim joint can be fastened to the other lobe 138 of the bell crank 134 and the pair of crank arms 110 and 114. A casing with a threaded shaft of the Heim joint can be fastened to the ends of the rods 142 and 144 to receive the ball swivel. This allows the connection between the rods 142 and 144 to pivot and move during oscillation.

In one aspect, the slip clutches 104 and 106 and the crank arms 110 and 114 pivot back and forth in an oscillating motion through less than 180 degrees, as shown in FIGS. 1-7. Pivoting the slip clutches 104 and 106 less than 180 degrees resists dead spots or binding positions where a force vector is aligned with the pivot axis. The radial length of the lobes 136 and 138 of the bell crank 134 can be sized to determine the degree of pivot of the slip clutches 104 and 106. In another aspect, the slip clutches 104 and 106 and the crank arms 110 and 114 pivot through less than 160 degrees. In another aspect, the slip clutches 104 and the crank arms 110 and 114 pivot through less than 140 degrees. In another aspect, the slip clutches 104 and 106 and the crank arms 110 and 114 pivot through approximately 125 degrees. Thus, the pair of rods 142 and 144 and the pair of crank arms 110 and 114 are never colinear with one another or the axle 102. In this way, dead spots or binding positions can be avoided where another linkage would become linear and difficult to pivot or turn, or would bind.

Figure 4:
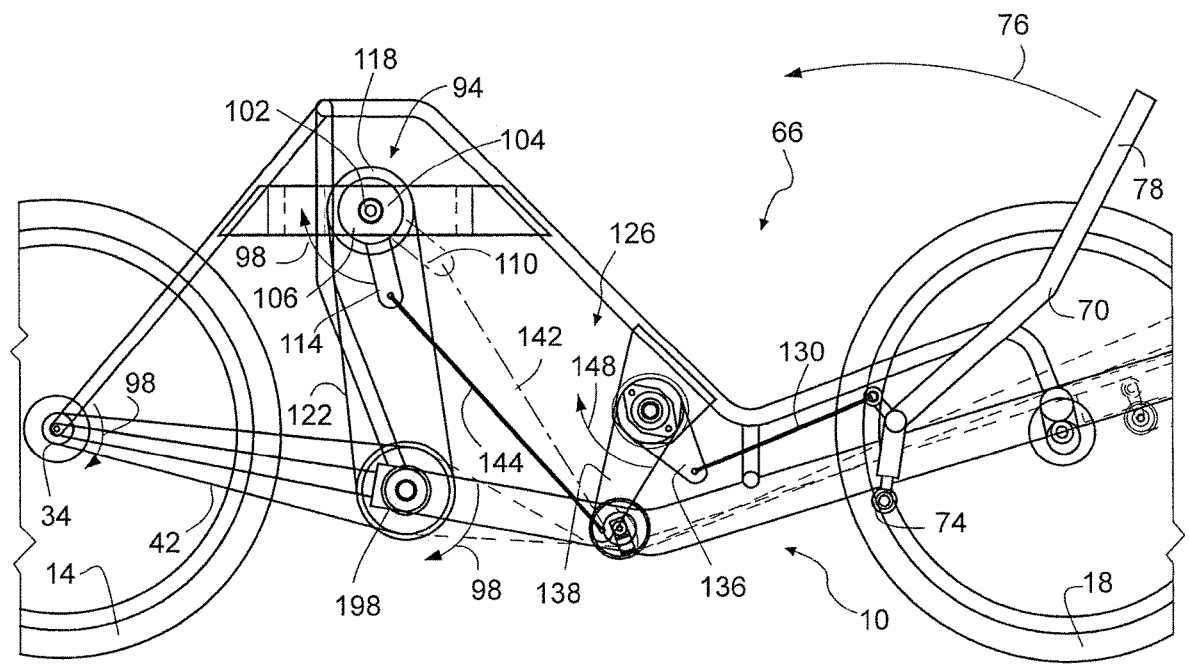
FIG. 4 is a partial side schematic view of the cycle of FIG. 1 showing the arm powered drive with the hand yoke beginning movement in the aft direction and highlighting the slip clutch beginning to be driven by pushing on a first side of the slip clutch while an opposite second side slips.
Figure 5:
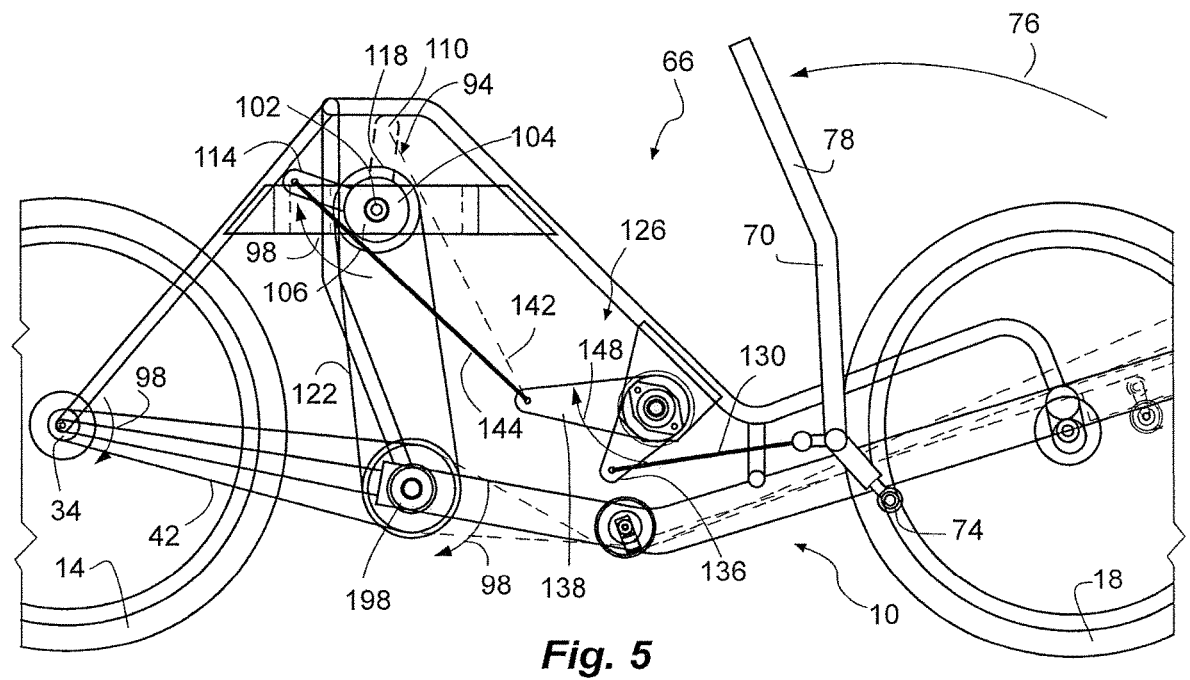
FIG. 5 is a partial side schematic view of the cycle of FIG. 1 showing the arm powered drive with the hand yoke ending movement in the aft direction and highlighting the slip clutch finishing being driven by pushing on the first side of the slip clutch while the opposite second side slips.
Figure 6:
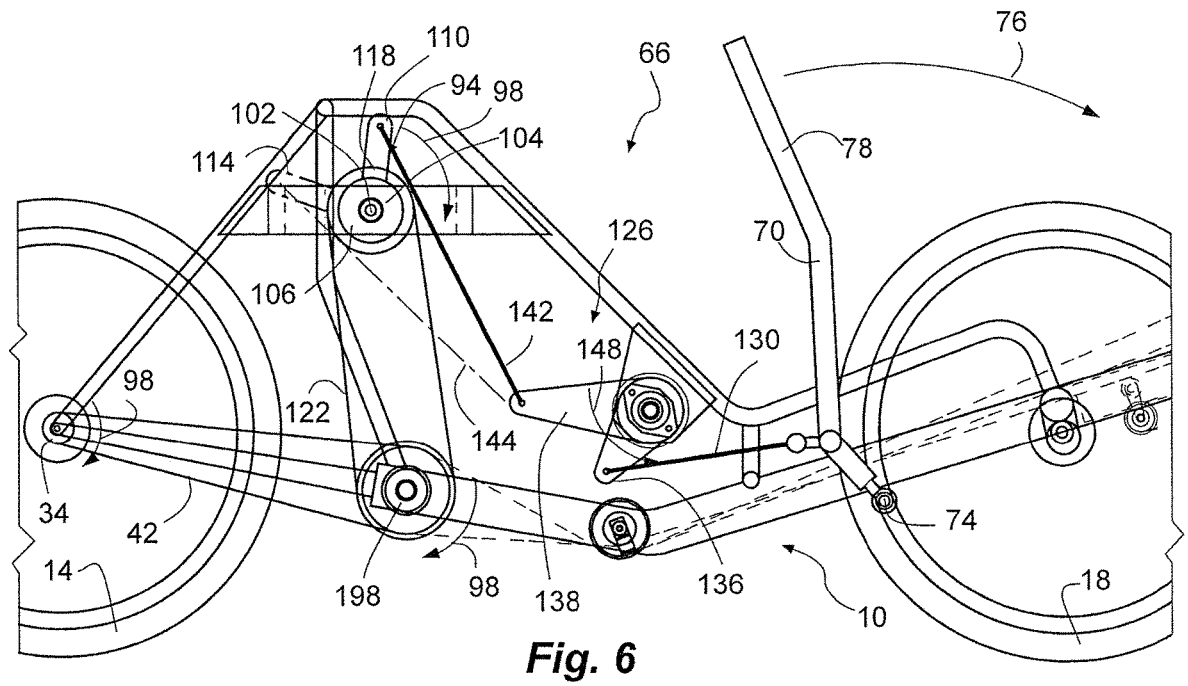
FIG. 6 is a partial side schematic view of the cycle of FIG. 1 showing the arm powered drive with the hand yoke beginning movement in the fore direction and highlighting the slip clutch beginning to be driven by pulling on the second side of the slip clutch while the first side slips.
Figure 7:
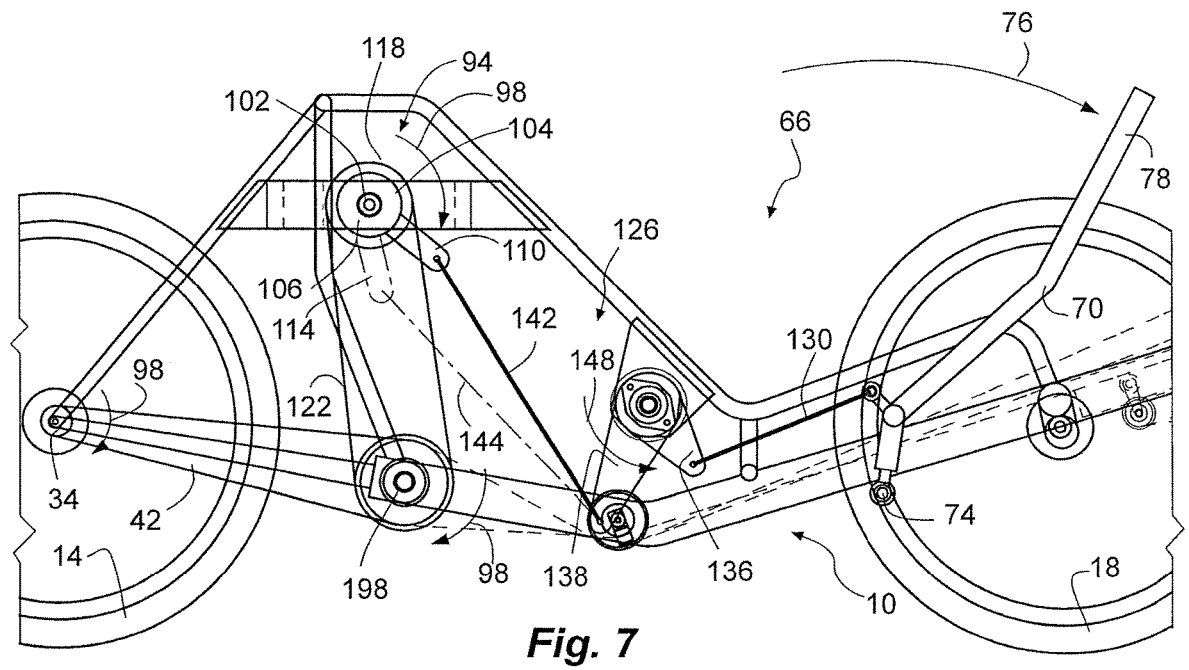
FIG. 7 is a partial side schematic view of the cycle of FIG. 1 showing the arm powered drive with the hand yoke ending movement in the fore direction and highlighting the slip clutch finishing being driven by pulling on the second side of the slip clutch while the first side slips.
Figure 8:
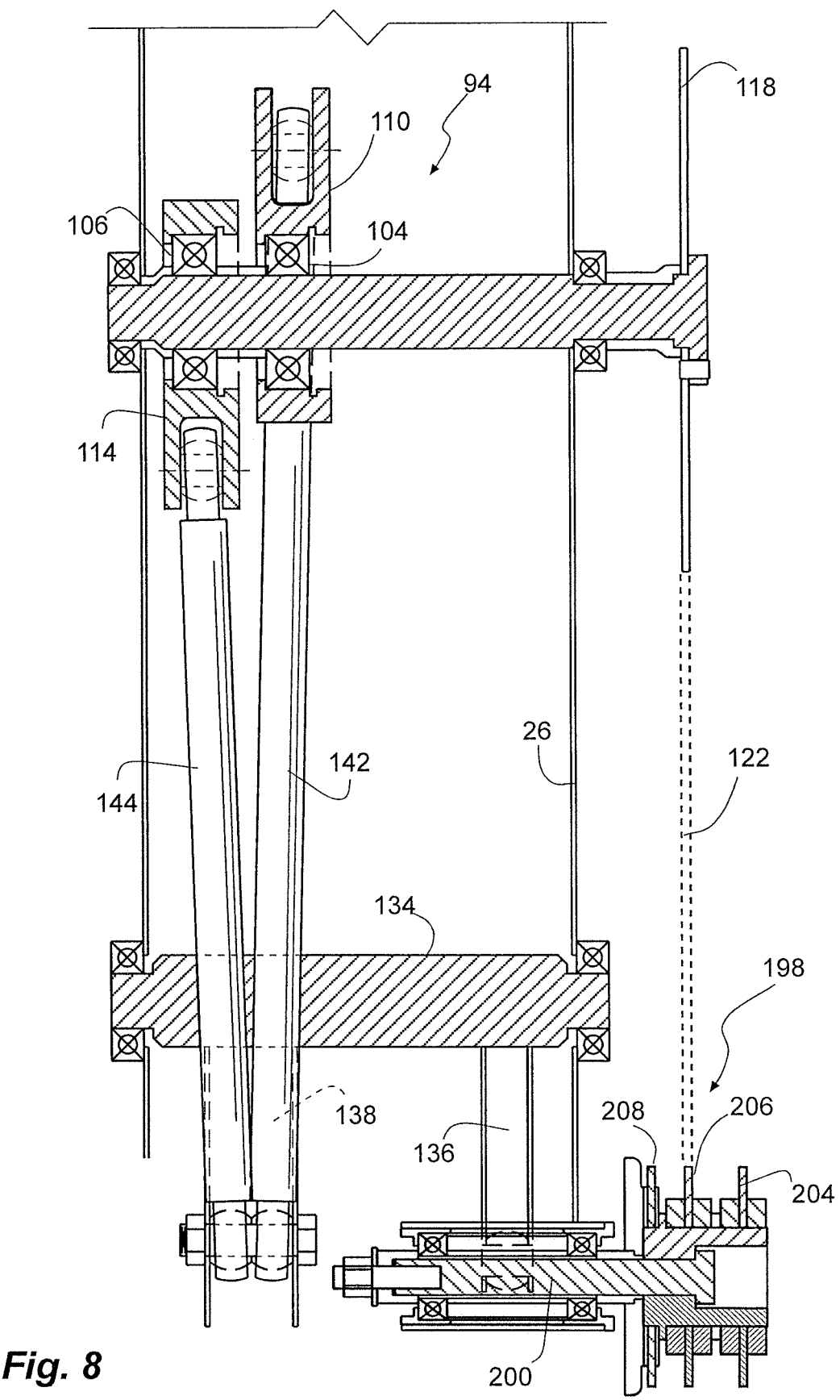
FIG. 8 is a partial cross-sectional schematic end view of the dual, reverse motion slip clutch and a linkage of the cycle of FIG. 1.

The hand bar 70 and the yoke 78 are intercoupled to the slip clutches 104 and 106 by the linkage 126 to turn the slip clutches 104 and 106 in opposite directions with respect to one another. The hand bar 70 and the yoke 78 drive the axle 102 in a forward direction with the aft slip clutch 106 when the hand bar 70 and the yoke 78 are pulled in an aft direction, while the fore slip clutch 104 slips on the axle 102 in an opposite rearward direction, as shown in FIGS. 4 and 5. The hand bar 70 and the yoke 78 then drive the axle 102 in the forward direction with the fore slip clutch 104 when the hand bar 70 and the yoke 78 are pushed in a fore direction, while the aft slip clutch 106 slips on the axle 102 in the opposite rearward direction, as shown in FIGS. 6 and 7.

Figure 2:
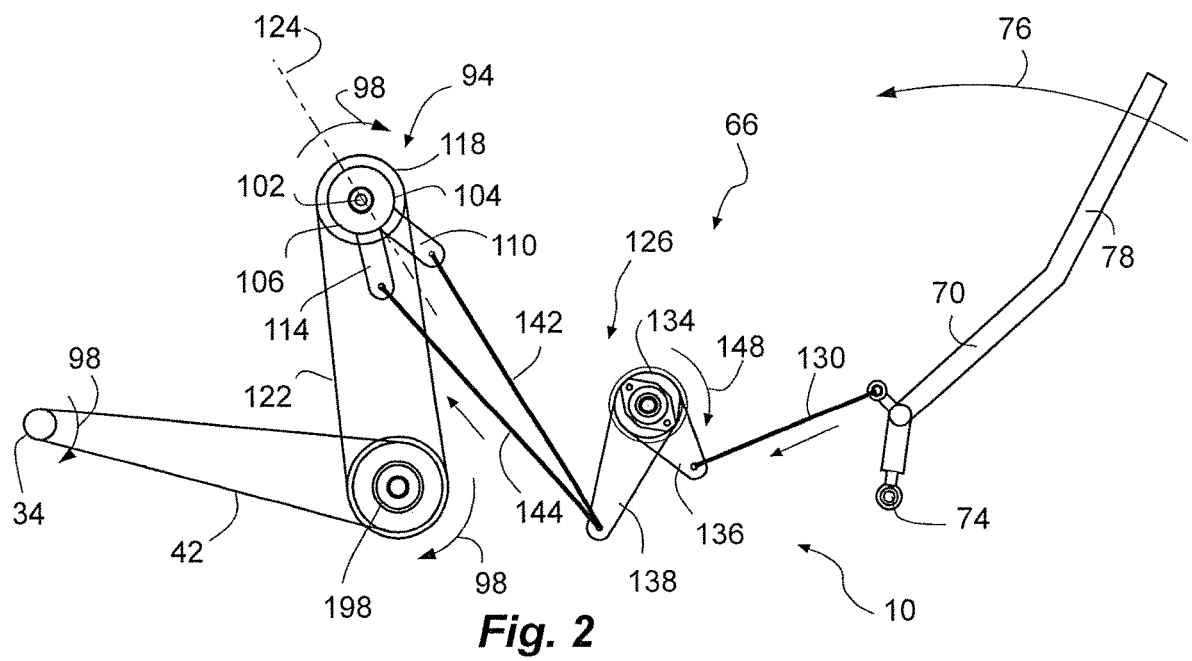
FIG. 2 is a partial side schematic view of the cycle of FIG. 1 showing the arm powered drive with the hand yoke moving in the aft direction and highlighting the slip clutch being driven by pushing on one side of the slip clutch.
Figure 3:
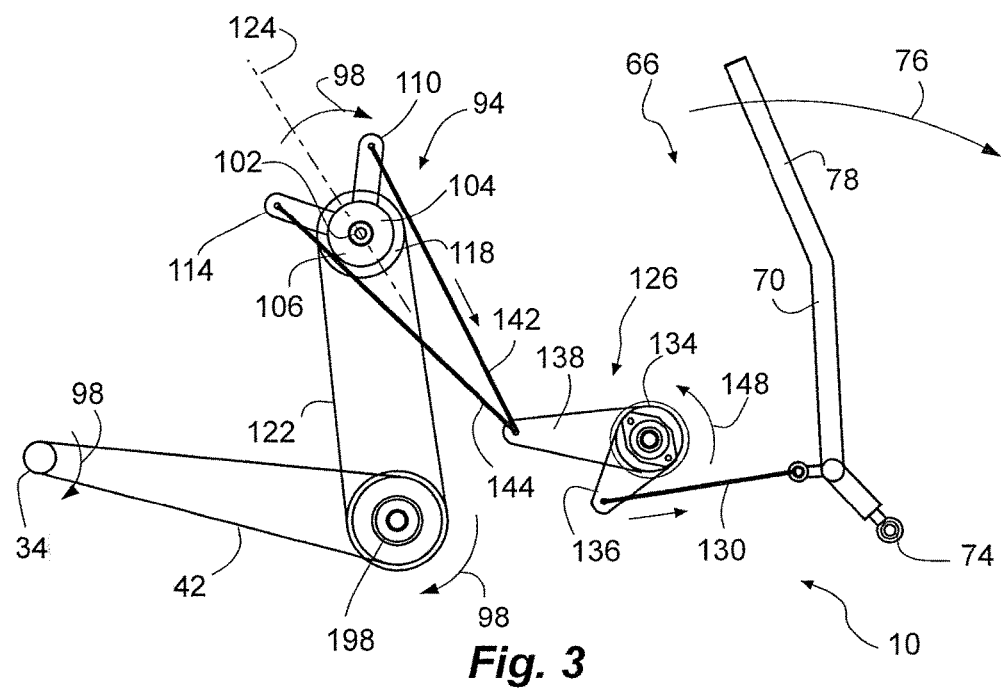
FIG. 3 is a partial side schematic view of the cycle of FIG. 1 showing the arm powered drive with the hand yoke moving in the fore direction and highlighting the slip clutch being driven by pulling on another side of the slip clutch.

Referring to FIGS. 2 and 3, both slip clutches 104 and 106 are pivoted as the hand bar 70 and the yoke 78 are pushed and pulled. In FIG. 2, the hand bar 70 and the yoke 78 are shown in the fore position. In FIG. 3, the hand bar 70 and the yoke 78 are shown in the aft position. The linkage 126 and the pair of rods 142 and 144 push and pull the crank arms 110 and 114, and thus pivot the slip clutches 104 and 106 in an oscillating motion back-and-forth on opposite sides of the axle 102. While both slip clutches 104 pivot on the axle 102, only one slip clutch engages and drives the axle 102 at a time, while the other slip clutch slips on the axle 102 without engaging or driving. In this way, the axle 102, the hand chain 122, the drive chain 42, the hub 34 and the driven wheel 14 are all driven in the same rotation direction 98 without oscillation, despite the oscillating movement of the hand bar 70, the yoke 78, the link arm 130, the bell crank 134, and the pair of rods 142 and 144.

Steering

The cycle 10 can have an integrated turning mechanism that utilizes the yoke 78. Thus, the yoke 78 can be used to both drive the driven wheel 14, and to steer the directional wheel(s) 18.

Referring again to FIGS. 9-11, the yoke 78 can have a gimbal 90 coupled to and between the frame 26 and the yoke 78. The yoke 78 is pivotally coupled to the gimbal 90. The yoke 78 pivots fore and aft 76 with respect to the gimbal 90 in a vertical plane and about a horizontal axis 152.

In addition, the gimbal 90 can be pivotally coupled to the frame 26 and the spine 30. Thus, the gimbal 90, and the yoke 78, pivot 156 with respect to the frame 26 in a substantially horizontal plane and about a substantially vertical axis 160 (FIG. 1).

The gimble 90 can comprise a bar 162 with an intermediate vertical bore 166. A fastener 170, such as a bolt, can extend through the bore 166 to secure the bar 162 to the spine 30 of the frame 26. A bearing 172 can be disposed in the bore 166 and can be retained with a c-ring 174. The bar 162 can pivot in the horizontal plane about the fastener 170, which forms a vertical axle. Opposite distal bores 176 can be formed in the opposite distal ends of the bar 162, and can extend axially with respect to the bar 162 and transvers with respect to the fastener 170. The bottom of the yoke 78 can have a pair of tabs 178 attached to the bar 162 and the gimble 90. A pair of fasteners, such as ball joints or Heim joints can couple the tabs 178 and of the yoke 78 to the bar 162 of the gimbal 90, and can form a horizontal axle 152 about which the yoke 78 pivots with respect to the bar 162 and the gimbal 90. In one aspect, the yoke 78 can be coupled to the gimbal 90 with ball joints. For example, the ball joints can be spherical bearings, such as a rod end bearing or a Heim joint. In one aspect, a ball swivel of the Heim joint can be fastened to the bar 162 of the gimbal 90, such as with a bolt fastened in the distal bores 176. A casing with a threaded shaft of the Heim joint can be fastened to the base 82 of the yoke 78 to receive the ball swivel.

A steering bell crank 180 can be carried by and pivotally coupled to the frame 26 and the spine 30. The steering bell crank 180 can be coupled to the directional wheel 18, such as with an arm 182, to pivot the direction wheel 18 on the spindle 58. A steering arm 184 can be coupled to and between the gimbal 90 and the steering bell crank 180. In one aspect, the steering arm 184 can be coupled to the gimbal 90 with a ball joint. For example, the ball joints can be spherical bearings, such as a rod end bearing or a Heim joint. In one aspect, a ball swivel of the Heim joint can be fastened to the gimbal 90. A casing with a threaded shaft of the Heim joint can be fastened to the steering arm 184 to receive the ball swivel. Similarly, ball swivel of the Heim joint can be fastened to the steering bell crank 180. A casing with a threaded shaft of the Heim joint can be fastened to the steering arm 184 to receive the ball swibel. Pivotal motion of the yoke 78 in the horizontal plane and about the vertical axis 160 (FIG. 1) causes the directional wheel 18 to pivot in the horizontal plane and about a vertical axis 54 (FIG. 1) through the steering arm 184 and the steering bell crank 180.

Therefore, the yoke 78 can both drive the driven wheel 14 and steer the directional wheel 18 through the gimbal 90.

Leg Drive

Referring again to FIG. 1, the cycle 10 can also have a leg drive 188. The leg drive 188 can comprise a foot crank 190 with peddles. The foot crank 190 can be carried by the spine 30 of the frame 26. In addition, the foot crank 190 can be coupled to the driven wheel 14. The foot crank 190 can be positioned at the forward end of the spine 30, and forward of the seat 22. In one aspect, the foot crank 190 can be on a telescoping tube expending from an open tube of the spine 30. Thus, the foot crank 190 can be selectively positioned towards and away from the seat 22 to accommodate the leg length of the rider. A foot chain 192 can be coupled to the foot crank 190 and the driven wheel 14. A take-up real can be coupled to the spine 30 of the frame 26 to take up slack of the foot chain 192 as the position of the foot crank 190 is adjusted.

Combiner

Figure 12:
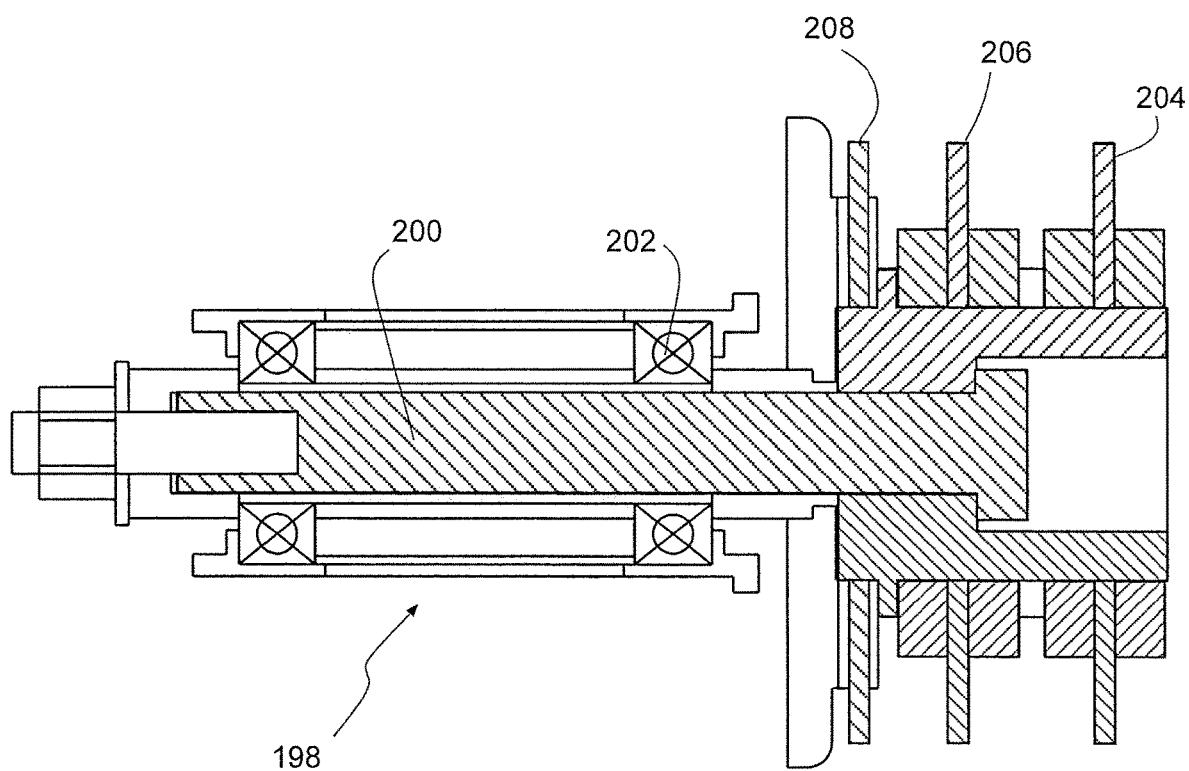
FIG. 12 is a cross-sectional end view of a combiner of the cycle of FIG. 1.
Figure 13:
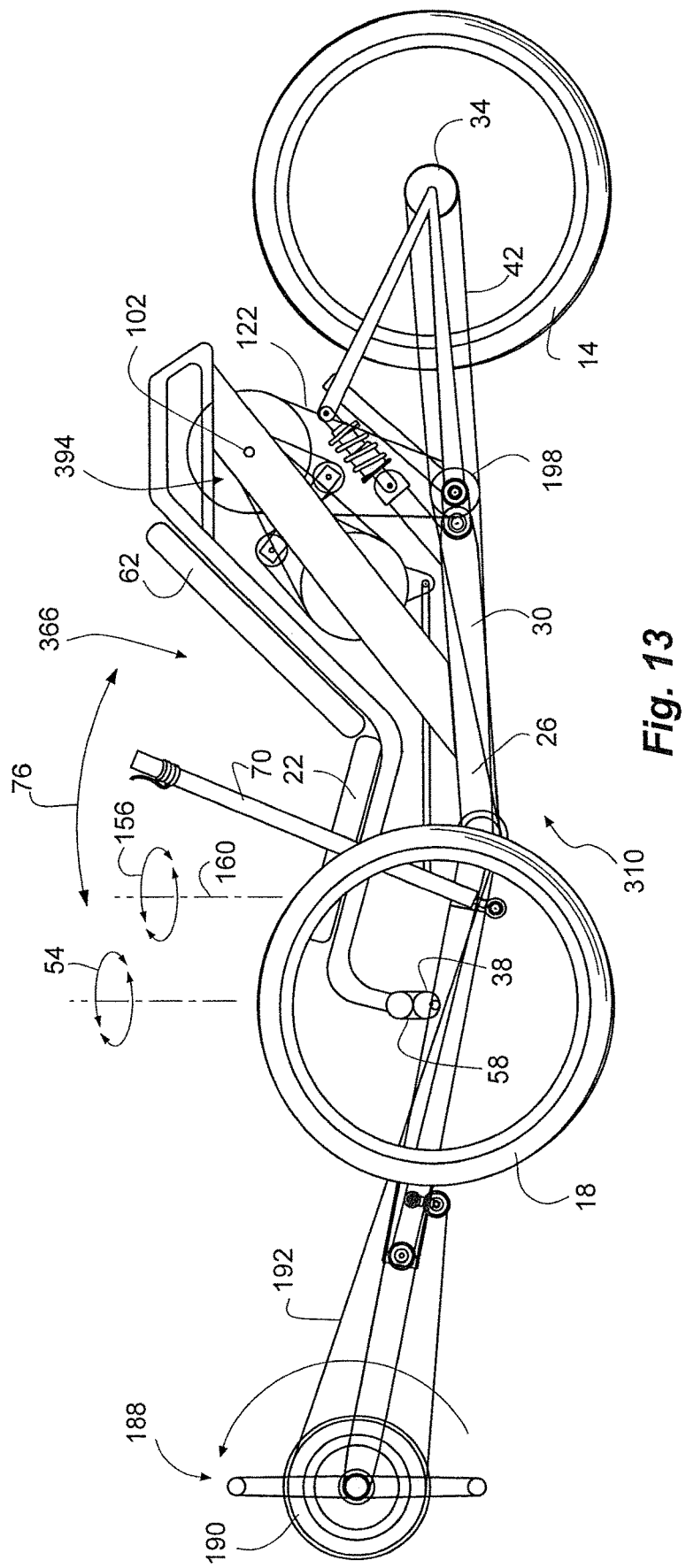
FIG. 13 is a side schematic view of another cycle with the arm powered drive with the hand yoke having the fore and aft motion and another dual, reverse motion slip clutch and a chain system in accordance with an embodiment of the invention.
Figure 14:
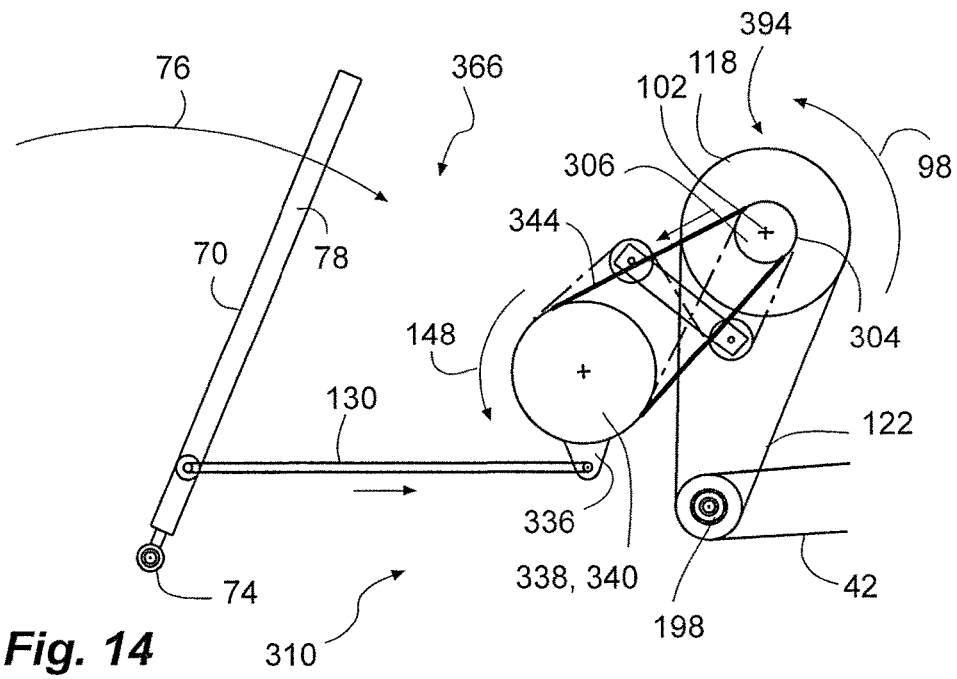
FIG. 14 is a partial side schematic view of the cycle of FIG. 13 showing the arm powered drive with the hand yoke moving in the aft direction and highlighting the slip clutch being driven by pulling a chain.
Figure 15:
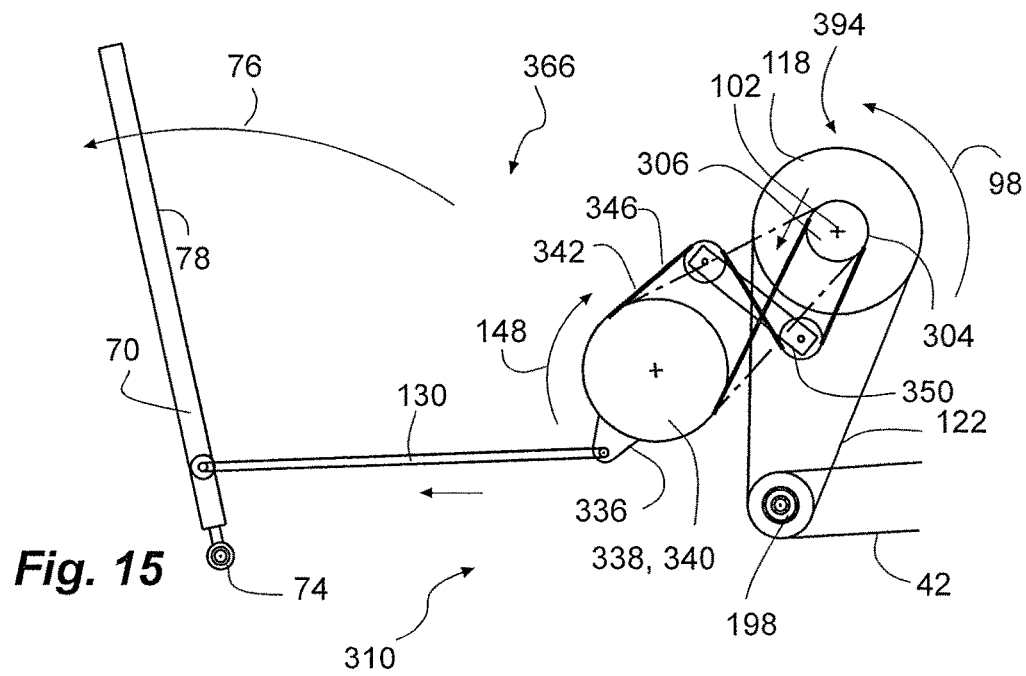
FIG. 15 is a partial side schematic view of the cycle of FIG. 13 showing the arm powered drive with the hand yoke moving in the fore direction and highlighting the slip clutch being driven by pulling a chain.
Figure 18:
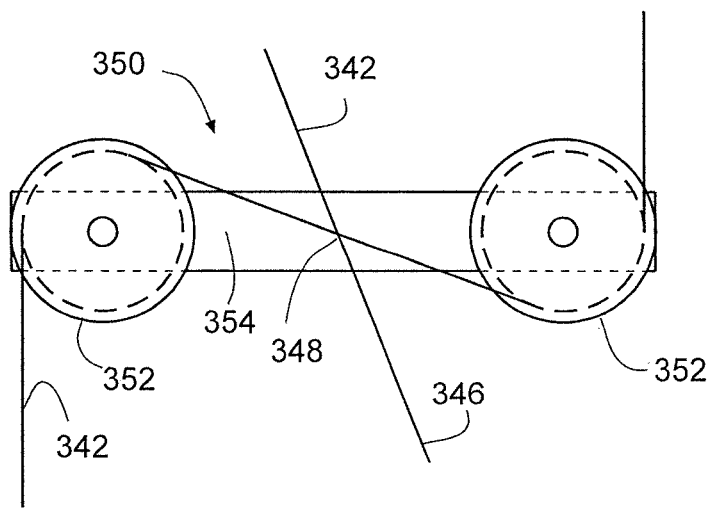
FIG. 18 is a side schematic view of a chain diverter of the cycle of FIG. 13.
Figure 19:
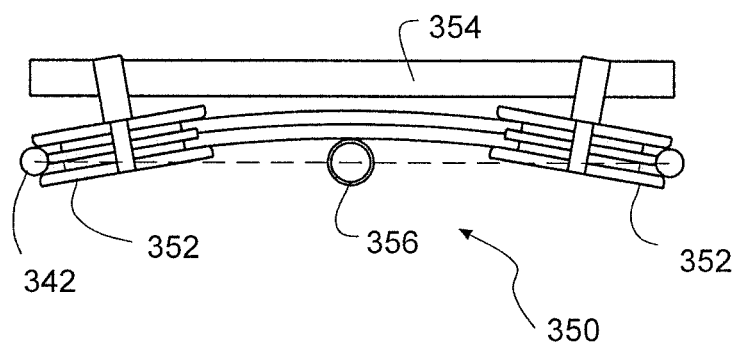
FIG. 19 is a top schematic view of the chain diverter of the cycle of FIG. 13.

Referring to FIGS. 1 and 12, a combiner 198 can combine the motion and force from the arm drive 66 and the leg drive 188. The combiner 198 can be carried by the spine 30 of the frame 26, and can be coupled to the foot crank 190 and the hand bar 70 and the yoke 78. The combiner 198 can comprise a combiner axle 200 carried by the spine 30 of the frame 26 and associated with the driven wheel 14. The combiner axle 200 can rotate in a bearing 202 in a bore in the spine 30 of the frame 26. A foot slip clutch sprocket 204 can be carried by the combiner axle 200 and coupled to the foot crank 190 by the foot chain 192. The foot crank 190 can turn the foot slip clutch sprocket 204. A hand slip clutch sprocket 206 can also be carried by the combiner axle 200 and can be coupled to the hand bar 70 and the yoke 78 by the hand chain 122. The hand bar 70 and the yoke 78 can turn the hand slip clutch sprocket 206. The hand and foot slip clutch sprockets 206 and 204 can turn the axle 200 individually, or in combination. They 206 and 204 can slip with respect to the axle 200 as one turns faster than the other.

A discharge sprocket 208 can be fixed to the combiner axle 200 and coupled to the hub 34 of the driven wheel 14 by a continuous chain, such as the drive chain 42. The discharge sprocket 208 turns with the axle 200 and is turned by the foot slip clutch 204, or the hand slip clutch 206, or both.

In another aspect, the cycle 10 can comprise a motor to assist in propulsion. The motor can be an electric motor incorporated into the hub. A battery can be carried by the frame 26 and coupled to the motor.

Second Exemplary Embodiment

Referring to FIGS. 13-19, another hand cycle 310 is shown that can provide arm propulsion in addition to, or in place of, leg propulsion. The cycle 310 is similar in many respects to that described before, and the preceding description is incorporated herein by reference. The subsequent description applies to the preceding embodiment as well. The cycle 310 can be configured as a recumbent tricycle.

Converter—Rotational Motion—Second Embodiment

The arm drive 366 can comprise a multi-directional drive or combiner 394. The pair of slip clutches 104 and 106 can have a pair of sprockets 310 and 314, rather than the crank arms. With the sprockets 310 and 314, the slip clutches can be a pair of slip clutch sprockets 304 and 306, including a fore slip clutch sprocket 306 and an aft slip clutch sprocket 304. The fore and aft slip clutch sprockets 306 and 304 can be colinear with and carried by the axle 102.

Linkage—Second Embodiment

The cycle can have a linkage 366 as described above but with a pair of oscillating sprockets 338 and 340. The oscillating sprockets 338 and 340 can be carried by and pivotal with respect to the spine 30 of the frame 26. The link bar 130 is coupled from the hand bar 70 and the yoke 78 to the oscillating sprockets 338 and 340. The link can be coupled to a crank arm 336 coupled to and associated with the oscillating sprockets 338 and 340. The fore and aft motion 76 of the yoke 78 and the hand bar 70 is translated to back-and-forth pivotal oscillation 148 of the pair of oscillating sprockets 338 and 340 through the link bar 130. The pair of oscillating sprockets comprise a fore oscillating sprocket 338 and an aft oscillating sprocket 340. The oscillating sprockets 338 and 340 can be coupled to the converter 394.

A pair of chains 342 and 344 can form a pair of loops between the pair of oscillating sprockets 338 and 340 and the pair of slip clutch sprockets 306 and 304. A fore chain 342 can form a fore loop around the fore oscillating sprocket 338 and the fore slip clutch sprocket 306. An aft chain 344 can form an aft loop around the aft oscillating sprocket 340 and the aft slip clutch sprocket 304. Because the oscillating sprockets 338 and 340 rotate in the same direction, the pair of chains 342 and 344 can loop around the pair of slip clutch sprockets 306 and 304 in different directions. For example, one of the pair of chains and the corresponding loop, such as the fore chain 342 and the fore loop, can be twisted and reversed with respect to the other chain, such as the aft chain 344. The aft chain 344 and the aft loop can have a straight section extend between the fronts of the aft oscillating sprocket 340 and the aft sip clutch sprocket 304 in a front-to-front manner; and another section extending between the backs thereof in a back-to-back manner. The fore chain 342, however, can have a straight section extending between the back of the fore oscillating sprocket 338 and the front of the fore slip clutch sprocket 306 in a back-to-front manner; and another section extending between the front of the fore oscillating sprocket 338 and the back of the fore slip clutch sprocket 306 in a front-to-back manner.

In one aspect, one of the pair of chains and the corresponding loop, such as the fore chain 342 and fore loop, can be formed in a figure-eight loop 346. The figure-eight loop 346 can have a cross-over 348 where the chain 342 intersects between corresponding oscillating and slip clutch sprockets, such as the fore oscillating sprocket 338 and the fore slip clutch sprocket 306.

A chain diverter 350 can be associated with the figure-eight loop 346 and located at the cross-over 348. The chain diverter 350 can position the chain 342 spaced-apart at the cross-over 348. Thus, the chain diverter 350 can separate the chain 342 at the cross-over 348 to keep the chain 342 from contacting itself. The chain diverter 350 can comprise a pair of spaced-apart intermediate sprockets 352. The chain 342 can loop around the intermediate sprockets 352. The intermediate sprockets 352 can be carried by and coupled to a bar 354 carried by the frame 26. In one aspect, the intermediate sprockets 352 can have pivot axes that traverse one another at an acute angle so that the sprockets 352 are tilted in toward one another. In another aspect, the chain diverter 350 can have a spacer 356, such as an elastomeric and resilient tube, between the cross-over 348 where the chain 342 intersects to separate the overlapping and intersecting portion of the chain 342 to resist the chain 342 bearing and wearing against itself.

Third Exemplary Embodiment

Figure 20:
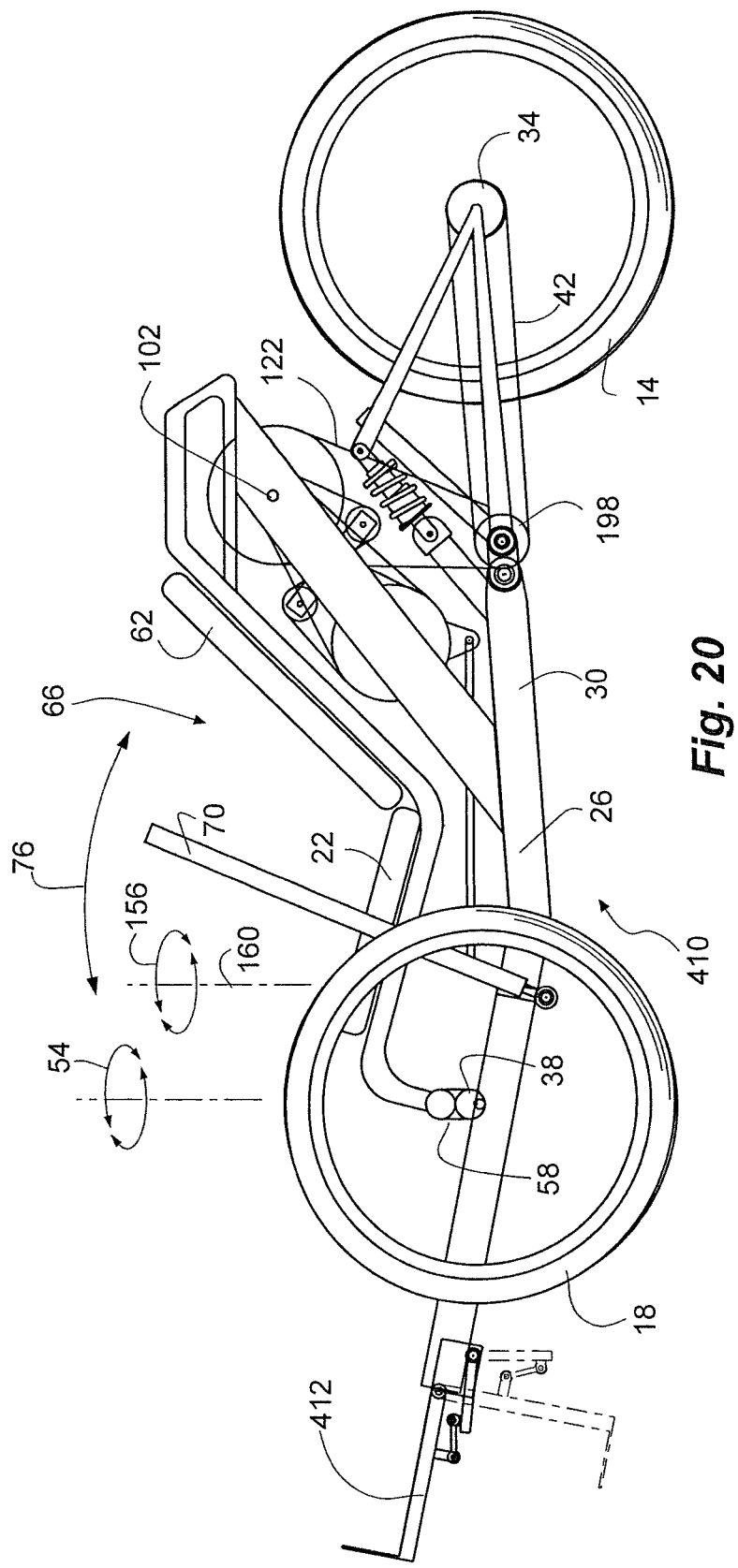
FIG. 20 is a side schematic view of another cycle with the arm powered drive and a foot/leg rest support that selectively raises and lowers in accordance with an embodiment of the invention.
Figure 21:
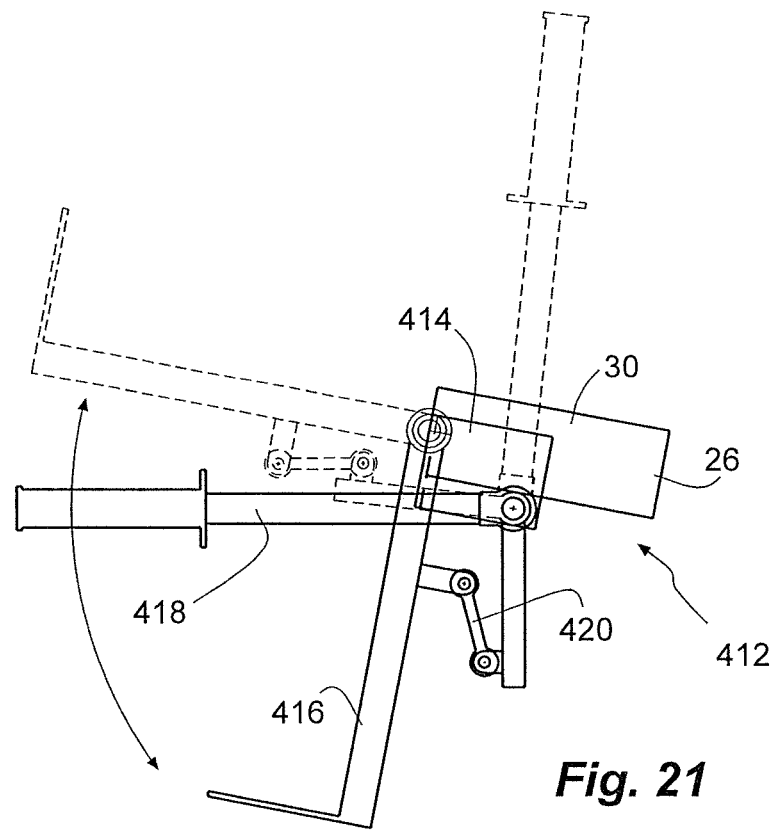
FIG. 21 is a side schematic view of the foot/leg rest support of the cycle of FIG. 20.
Figure 22:
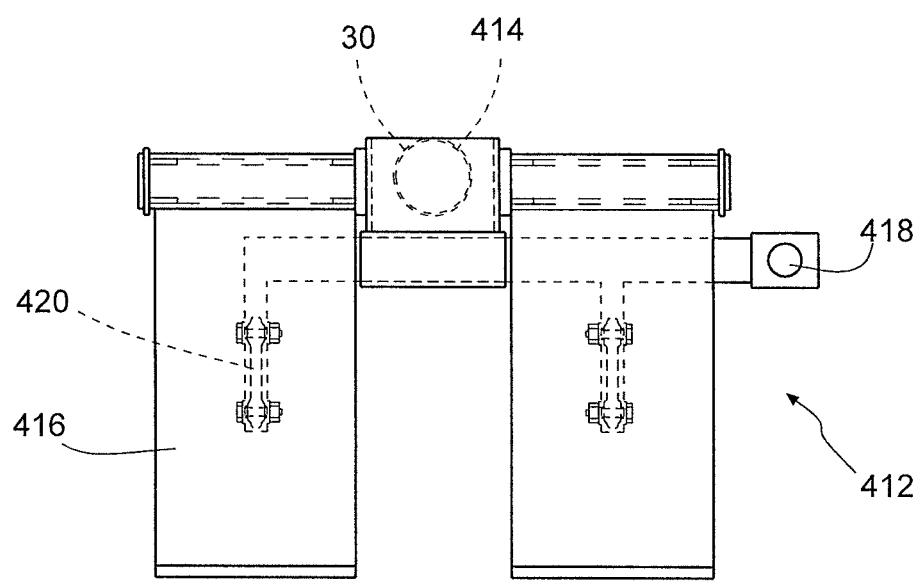
FIG. 22 is a front schematic view of the foot/leg rest support of the cycle of FIG. 20.

Referring to FIGS. 20-22, another hand cycle 410 is shown that can provide arm propulsion in place of leg propulsion. The cycle 410 is similar in many respects to those described before, and the preceding descriptions are incorporated herein by reference. The subsequent description applies to the preceding embodiments as well. The cycle 410 can be configured as a recumbent tricycle and for use by a paraplegic rider. Thus, the cycle 410 can be without a leg drive, a foot crank, or a combiner as described above. The cycle 410 can have a foot and/or leg rest support 412 to receive the rider's legs and/or feet. The support 412 can provide rider accessibility for a paraplegic rider.

The foot and/or leg rest support 412 can be coupled to the spine 30 of the frame 26. In one aspect, an open end of the spine 30 can form a receiver tube to receive a mount 414 received into the receiver tube. The support 412 can have at least one brace 416 that can be pivotally coupled to mount 414, and thus the spine 30. The brace 416 can pivot between a lowered position and a raised position. In the lowered position, support 412 allows the seat 22 of the cycle 410 to be open to receive the rider. The rider can lean forward and strap their legs to the brace 416. In the raised position, a bottom or foot plate of the brace 416 can form a front bumper to protect the rider's feet and legs.

In one aspect, an arm 418 can be coupled to the brace 416 to selectively raise and lower the brace 416 with respect to the frame 26. The arm 418 can be transverse to the brace 416 to be reached by a seated rider. In another aspect, the arm 418 can be removably coupled to the brace 416 to resist interference during riding.

A link 420 can be coupled to and between the arm 418 and the brace 416. The link 420 can form an over center mechanism with the brace 416 and the mount 412 to hold the brace 416 in the raised position.

Unless otherwise specified, as used herein, the term "chain" refers broadly to a fixed-length, flexible line to transfer power. The chain can be a connected flexible series of metal links. The term "chain" is also used broadly to include a toothed belt or cogged belt.

Unless otherwise specified, as used here, the term "sprocket" refers to a rotating or pivoting wheel that operatively coupled to the chain to transfer motion. The sprocket can be a wheel with teeth received between links of a chain. The sprocket can be wheel with teeth received between cogs of a belt.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of"

or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. An arm powered cycle, comprising:
   a frame carrying a seat and coupled to wheels including a driven wheel;
   an arm drive carried by the frame and coupled to the driven wheel, and comprising:
   a hand bar pivotally coupled to the frame and pivotal in a fore and aft direction with respect to the seat;
   an axle carried by the frame and associated with the driven wheel; and
   a pair of one-way slip clutches carried by and coupled to the axle to drive the axle in one direction and slip with respect to the axle in an opposite direction, and including a fore slip clutch and an aft slip clutch;
   a linkage coupled to the hand bar and the pair of slip clutches; and
   the hand bar, the pair of slip clutches and the linkage intercoupled to turn the pair of slip clutches in opposite directions with respect to one another and to:
   drive the axle in a forward direction with the aft slip clutch when the hand bar is pulled in an aft direction while the fore slip clutch slips on the axle in an opposite rearward direction, and drive the axle in the forward direction with the fore slip clutch when the hand bar is pushed in a fore direction while the aft slip clutch slips on the axle in the opposite rearward direction.

2. The arm powered cycle in accordance with claim 1, further comprising:
a pair of sprockets coupled to the pair of slip clutches and defining a pair of slip clutch sprockets carried by and coupled to the axle, including a fore slip clutch sprocket and an aft slip clutch sprocket;
a pair of oscillating sprockets carried by the frame and forming part of the linkage with fore and aft motion of the hand bar being translated to back and forth oscillation of the pair of oscillating sprockets, the pair of oscillating sprockets comprising a fore oscillating sprocket and an aft oscillating sprocket; and
a pair of chains forming a pair of loops including a fore chain forming a fore loop with a section extending between a front of the fore oscillating sprocket and a front of the fore slip clutch sprocket, and an aft chain forming an aft loop with a section between a back of the aft oscillating sprocket and a front of the aft slip clutch sprocket.

3. The arm powered cycle in accordance with claim 2, further comprising:
one of the pair of chains and a corresponding loop being formed in a figure-eight loop and having a cross-over between corresponding oscillating sprocket and slip clutch sprocket; and
a chain diverter associated with the figure-eight loop and located at the cross-over to position the chain spaced-apart at the cross-over.

4. The arm powered cycle in accordance with claim 1, further comprising:
a pair of crank arms coupled to and pivoting with the pair of slip clutches, including a fore crank arm coupled to the fore slip clutch and an aft crank arm coupled to the aft slip clutch;
the pair of crank arms being coupled to the linkage to turn the pair of slip clutches; and
the pair of crank arms extending in transverse directions with respect to one another and being located on opposite sides of the axle.

5. The arm powered cycle in accordance with claim 4, further comprising:
an oscillating bell crank carried by the frame and forming part of the linkage with fore and aft motion of the hand bar being translated to back and forth oscillation of the oscillating bell crank; and
a pair of link arms coupled to and between the oscillating bell crank and the pair of crank arms.

6. The arm powered cycle in accordance with claim 1, wherein the hand bar further comprises:
a yoke having a base and a pair of upright arms and defining a lever; and
a fulcrum at the base of the yoke pivotally coupled to the frame.

7. The arm powered cycle in accordance with claim 6, further comprising:
the seat and the yoke being positioned with the seat in a cavity of the yoke and between the pair of upright arms and above the base.

8. The arm powered cycle in accordance with claim 6, further comprising:
a gimbal coupled to and between the frame and the yoke with the gimbal being pivotally coupled to the frame, and the yoke being pivotally coupled to the gimbal;
the gimbal pivoting with respect to the frame about a substantially vertical axis; and
the yoke pivoting fore and aft with respect to the gimbal about a horizontal axis.

9. The arm powered cycle in accordance with claim 8, further comprising:
the wheels further comprising a directional wheel rotating about a horizontal axis and pivoting about a vertical axis;
a spindle coupled between the directional wheel and the frame;
a steering bell crank carried by the frame and coupled to the directional wheel and capable of pivoting the direction wheel on the spindle;
a steering arm coupled to and between the gimbal and the steering bell crank; and
pivotal motion of the yoke about the vertical axis causing the directional wheel to pivot about the vertical axis through the steering arm and the steering bell crank.

10. The arm powered cycle in accordance with claim 1, further comprising a leg drive, the leg drive comprising:
a foot crank with pedals carried by the frame and coupled to the driven wheel; and
a combiner coupled to the foot crank and the hand bar, the combiner comprising:
a combiner axle carried by the frame and associated with the driven wheel;
a foot slip clutch sprocket carried by the combiner axle and coupled to the foot crank with the foot crank turning the foot slip clutch; and
a hand slip clutch sprocket carried by the combiner axle and coupled to the hand bar with the hand bar turning the hand slip clutch.

11. The arm powered cycle in accordance with claim 1, further comprising:
the frame, the seat and the wheels being configured as a recumbent tricycle;
the frame comprising an elongated spine;
the wheels comprising a pair of front wheels pivotally coupled with respect to the elongated spine and located closer to a front of the elongated spine, and the driven wheel located closer to a rear of the elongated spine;
the seat being positioned between the pair of front wheels and the driven wheel;
the pair of one-way slip clutches being positioned behind the seat and between the seat and the driven wheel;
the hand bar comprising a yoke having:
a base with a fulcrum pivotally coupled to the spine and located under the seat; and
a pair of upright arms extending from the base with the seat positioned between the pair of upright arms;
the linkage comprising a link bar coupled to the yoke and extending under the seat towards the pair of on-way slip clutches behind the seat;
a hand chain coupled to the pair of one-way slip clutches;
a foot crank with pedals carried by the frame at the front of the spine;
a foot chain coupled to the foot crank;
a combiner carried by the spine and coupled to the foot crank and the yoke, the combiner comprising:
a combiner axle carried by the spine;
a foot slip clutch sprocket carried by the combiner axle and coupled to the foot crank by the foot chain and with the foot crank turning the foot slip clutch sprocket;
a hand slip clutch sprocket carried by the combiner axle and coupled to the pair of one-way slip clutches and with the yoke turning the hand slip clutch sprocket; and a discharge sprocket coupled to the combiner axle and the driven wheel, with the discharge sprocket being turned by the foot slip clutch, or the hand slip clutch, or both.

12. An arm powered cycle, comprising:
a frame carrying a seat and coupled to wheels including a driven wheel;
a yoke having a base and a pair of upright arms, and defining a lever;
a fulcrum at the base of the yoke pivotally coupled to the frame;
the yoke being pivotal about the fulcrum with respect to the frame, and pivotal in a fore and aft direction with respect to the seat;
the seat and the yoke being positioned with the seat in a cavity of the yoke and between the pair of upright arms and above the base and the fulcrum;
a linkage coupled between the yoke and the driven wheel with fore and aft motion of the yoke driving the driven wheel;
a gimbal coupled to and between the frame and the yoke with the gimbal being pivotally coupled to the frame and the yoke being pivotally coupled to the gimbal;
the gimbal pivoting with respect to the frame about a substantially vertical axis; and
the yoke pivoting fore and aft with respect to the gimbal about a horizontal axis.

13. The arm powered cycle in accordance with claim 12, further comprising:
the wheels further comprising a directional wheel rotating about a horizontal axis and pivoting about a vertical axis;
a spindle coupled between the directional wheel and the frame;
a steering bell crank coupled to the directional wheel and capable of pivoting the direction wheel on the spindle;
a steering arm coupled to and between the gimbal and the steering bell crank; and
pivotal motion of the yoke about the vertical axis causing the direction wheel to pivot about the vertical axis through the steering arm and the steering bell crank.

14. The arm powered cycle in accordance with claim 12, further comprising:
an arm drive carried by the frame and coupled to the driven wheel, and comprising:
the yoke;
an axle carried by the frame and associated with the driven wheel; and
a pair of one-way slip clutches carried by and coupled to the axle to drive the axle in one direction and slip with respect to the axle in an opposite direction, and including a fore slip clutch and an aft slip clutch;
the linkage coupled to the pair of slip clutches; and
the yoke, the pair of slip clutches and the linkage intercoupled to turn the pair of slip clutches in opposite directions and to:
drive the axle in a forward direction with the aft slip clutch when the yoke is pulled in an aft direction while the fore slip clutch slips on the axle in an opposite rearward direction, and
drive the axle in the forward direction with the fore slip clutch when the yoke is pushed in a fore direction while the aft slip clutch slips on the axle in the opposite rearward direction.

15. The arm powered cycle in accordance with claim 14, further comprising:
a pair of sprockets coupled to the pair of slip clutches and defining a pair of slip clutch sprockets carried by and coupled to the axle, including a fore slip clutch sprocket and an aft slip clutch sprocket;
a pair of oscillating sprockets carried by the frame and forming part of the linkage with fore and aft motion of the yoke being translated to back and forth oscillation of the pair of oscillating sprockets, the pair of oscillating sprockets comprising a fore oscillating sprocket and an aft oscillating sprocket;
a pair of chains forming a pair of loops including a fore chain forming a fore loop with a section extending between a front of the fore oscillating sprocket and a front of the fore slip clutch sprocket, and an aft chain forming an aft loop with a section between a back of the aft oscillating sprocket and a front of the aft slip clutch sprocket.

16. The arm powered cycle in accordance with claim 15, further comprising:
one of the pair of chains and a corresponding loop being formed in a figure-eight loop and having a cross-over between corresponding oscillating sprocket and slip clutch sprocket; and
a chain diverter associated with the figure-eight loop and located at the cross-over to position the chain spaced-apart at the cross-over.

17. The arm powered cycle in accordance with claim 14, further comprising:
a pair of crank arms coupled to and pivoting with the pair of slip clutches, including a fore crank arm coupled to the fore slip clutch and an aft crank arm coupled to the aft slip clutch;
the pair of crank arms being coupled to the linkage to turn the pair of slip clutches; and
the pair of crank arms extending in transverse directions with respect to one another and being located on opposite sides of a plane defined by the axle and the link.

18. The arm powered cycle in accordance with claim 17, further comprising:
an oscillating bell crank carried by the frame and forming part of the linkage with fore and aft motion of the yoke being translated to back and forth oscillation of the oscillating bell crank; and
a pair of link arms coupled to and between the oscillating bell crank and the pair of crank arms.

19. The arm powered cycle in accordance with claim 12, further comprising a leg drive, the leg drive comprising:
a foot crank with pedals carried by the frame and coupled to the driven wheel; and
a combiner coupled to the foot crank and the yoke, the combiner comprising:
a combiner axle carried by the frame and associated with the driven wheel;
a foot slip clutch sprocket carried by the combiner axle and coupled to the foot crank with the foot crank turning the foot slip clutch; and
a hand slip clutch sprocket carried by the combiner axle and coupled to the yoke with the yoke turning the hand slip clutch.

20. An arm powered cycle, comprising:
a frame carrying a seat and coupled to wheels including a driven wheel;
a hand bar pivotally coupled to the frame and pivotal in a fore and aft direction with respect to the seat, and coupled to the driven wheel;
a linkage including a hand chain coupled to the hand bar;
a foot crank with pedals carried by the frame and coupled to the driven wheel;

a foot chain coupled from the foot crank;

a combiner coupled to the foot crank and the hand bar, the combiner comprising:

a combiner axle carried by the frame and associated with the driven wheel;

a foot slip clutch sprocket carried by the combiner axle and coupled to the foot crank by the foot chain with the foot crank turning the foot slip clutch;

a hand slip clutch sprocket carried by the combiner axle and coupled to the hand bar by the hand chain with the hand bar turning the hand slip clutch; and a discharge sprocket coupled to the combiner axle and the driven wheel, with the discharge sprocket being turned by the foot slip clutch, or the hand slip clutch, or both.

21. An arm drive configured for a cycle, comprising:

a hand bar configured to be pivotally coupled to a frame of the cycle and pivotal in a fore and aft direction with respect to a seat of the cycle;

an axle configured to be carried by the frame and associated with a driven wheel of the cycle;

a pair of one-way slip clutches carried by and coupled to the axle to drive the axle in one direction and slip with respect to the axle in an opposite direction, and including a fore slip clutch and an aft slip clutch;

a linkage coupled to the hand bar and the pair of slip clutches; and the hand bar, the pair of slip clutches and the linkage intercoupled to turn the pair of slip clutches in opposite directions with respect to one another and to:

drive the axle in a forward direction with the aft slip clutch when the hand bar is pulled in an aft direction while the fore slip clutch slips on the axle in an opposite rearward direction, and drive the axle in the forward direction with the fore slip clutch when the hand bar is pushed in a fore direction while the aft slip clutch slips on the axle in the opposite rearward direction.

22. The arm drive in accordance with claim 21, further comprising:

a yoke having a base and a pair of upright arms and defining a lever;

a fulcrum at the base of the yoke configured to be pivotally coupled to the frame;

the yoke being configured to be positionable with the seat in a cavity of the yoke and between the pair of upright arms and above the base;

a gimbal being pivotally coupled to the yoke and configured to be pivotally coupled to the frame;

the gimbal configured to pivot with respect to the frame about a substantially vertical axis; and the yoke pivoting fore and aft with respect to the gimbal about a horizontal axis.

23. The arm drive in accordance with claim 21, further comprising a leg drive, the leg drive comprising:

a foot crank with pedals configured to be carried by the frame and coupled to the driven wheel; and a combiner coupled to the foot crank and the hand bar, the combiner comprising:

a combiner axle configured to be carried by the frame and associated with the driven wheel;

a foot slip clutch sprocket carried by the combiner axle and coupled to the foot crank with the foot crank turning the foot slip clutch; and a hand slip clutch sprocket carried by the combiner axle and coupled to the hand bar with the hand bar turning the hand slip clutch.

\* \* \* \* \*